3,369,762
MOBILE FEED GRINDING AND MIXING AND
DISTRIBUTING APPARATUS
Robert J. Buzenberg and Peter C. De Graff, Manhattan,
Kans., assignors to Viking Manufacturing Company,
Manhattan, Kans.
Filed June 1, 1965, Ser. No. 461,228
7 Claims. (Cl. 241—63)

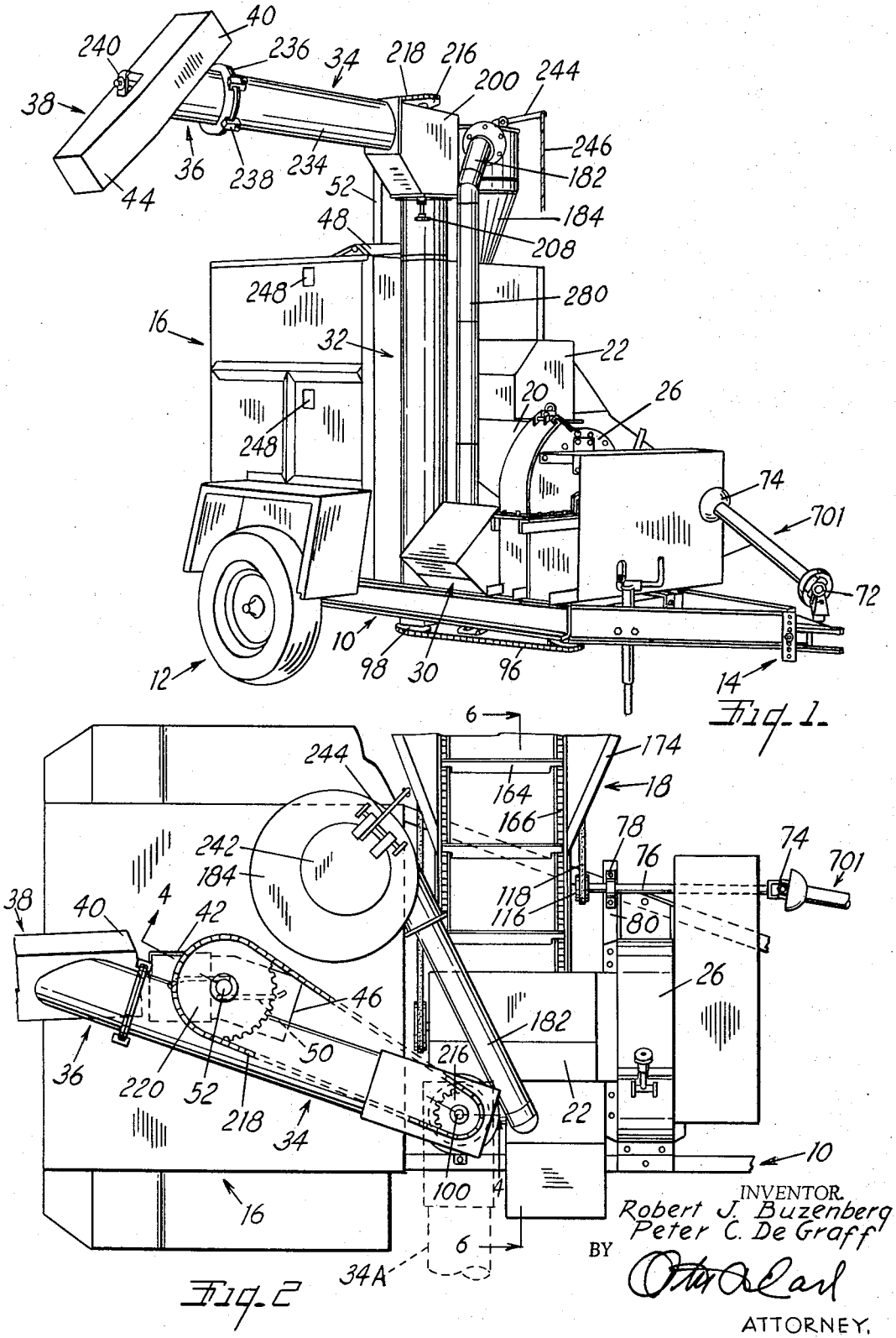

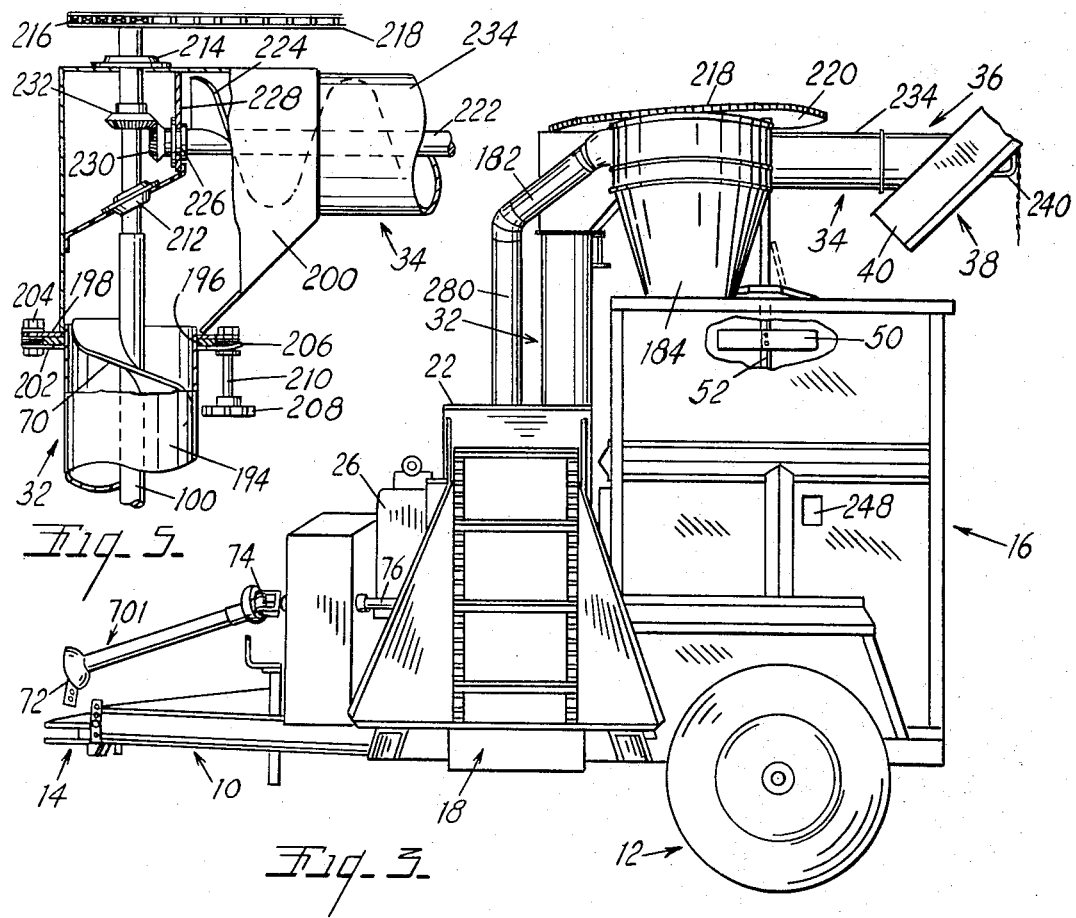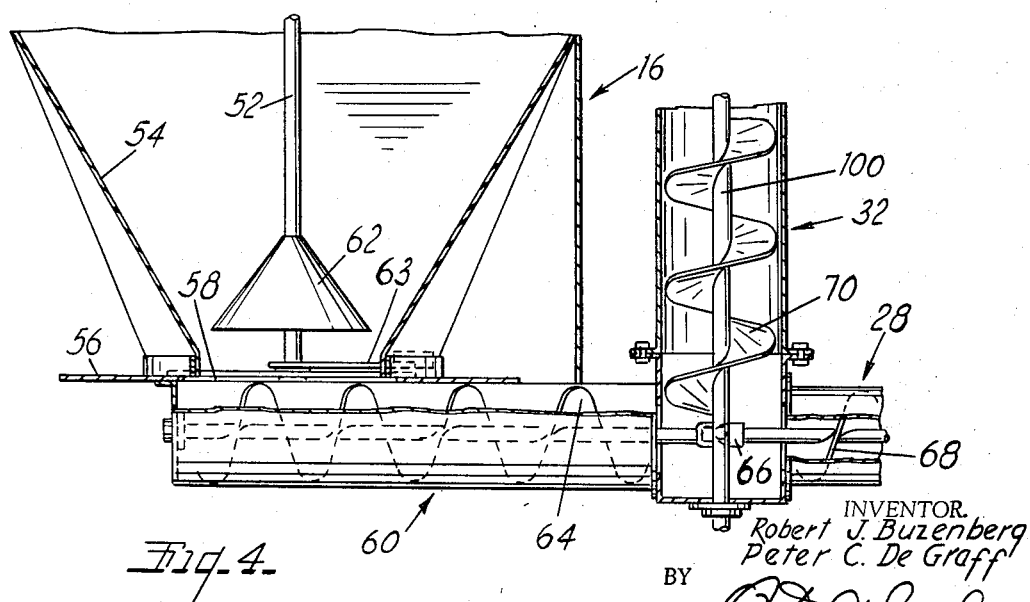

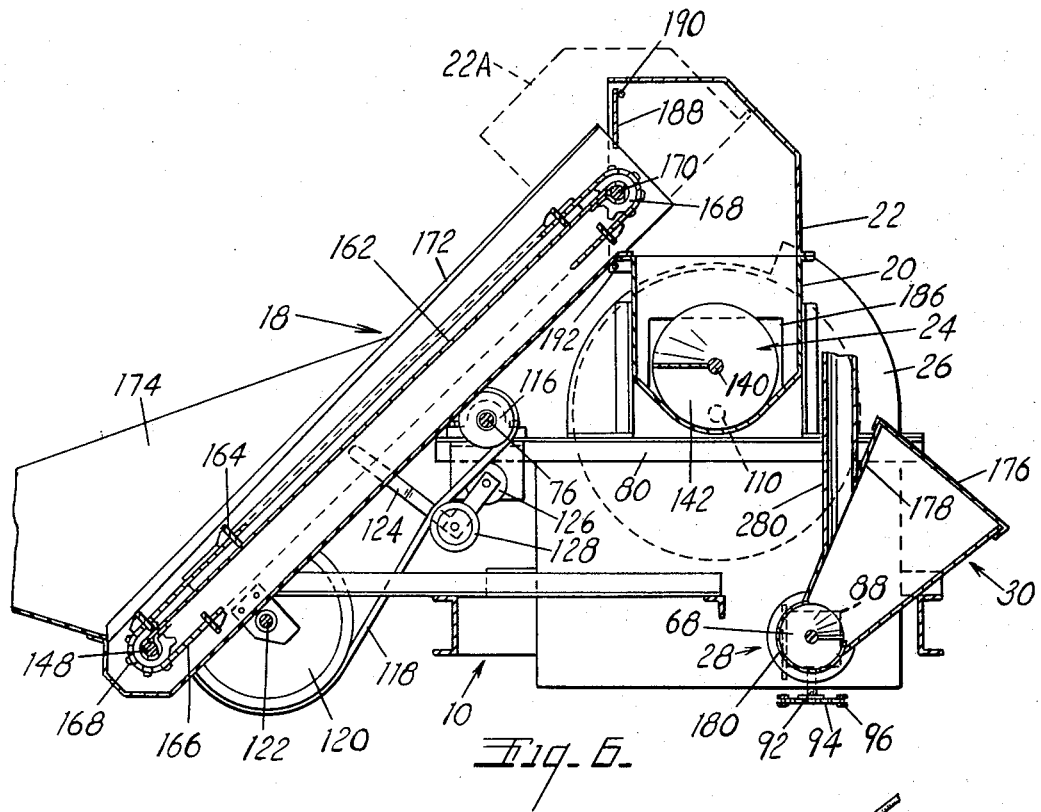
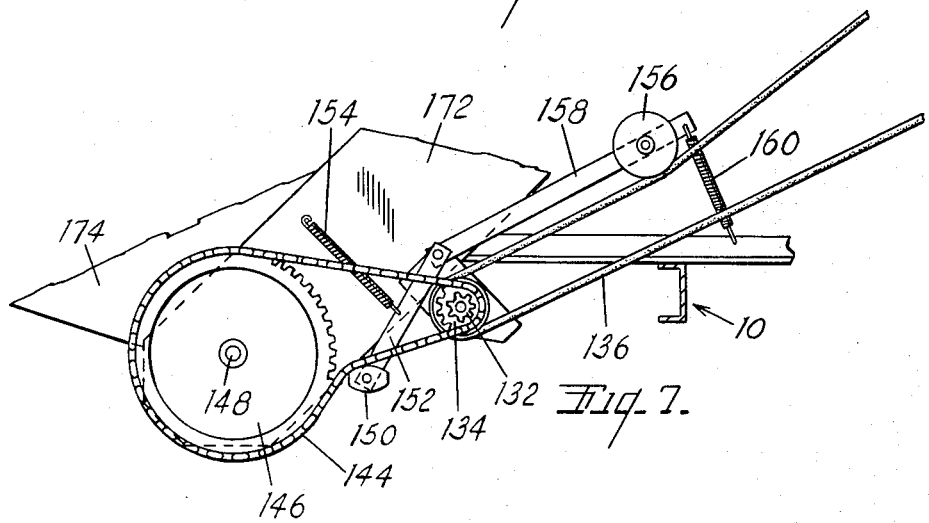

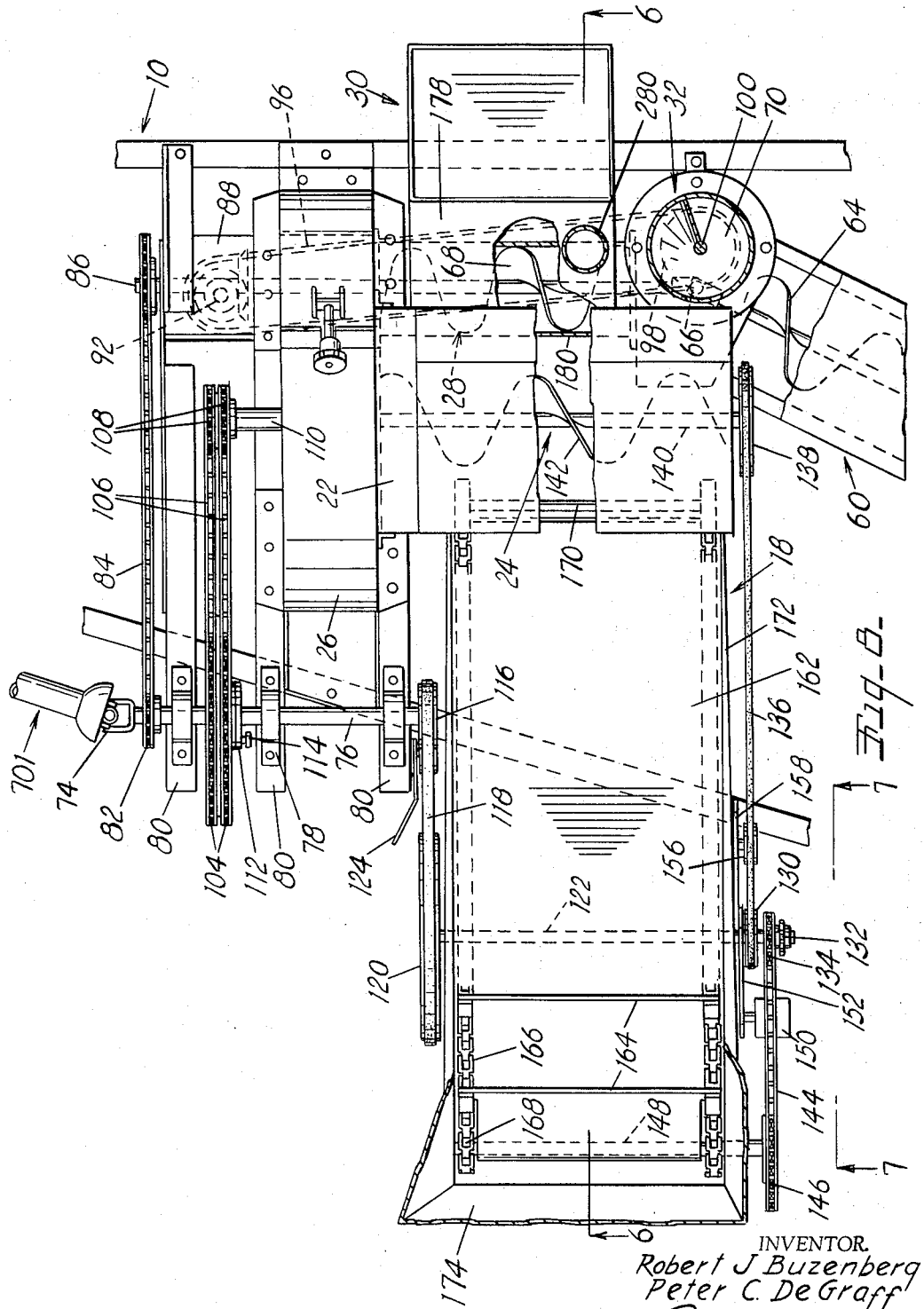

ABSTRACT OF THE DISCLOSURE

A mobile grinding and mixing apparatus having a grinding mill thereon for grinding natural feeds. The ground feed is fed through a first screw conveyor into a second upright screw conveyor and is then deposited into the upper end of a mixing tank. A hopper containing feed supplements is positioned adjacent the first screw conveyor to permit the supplements to be mixed with the natural feed as it is transported through the first screw conveyor. A third screw conveyor permits material to be removed from the tank and recirculated through the second upright screw conveyor so as to mix same with the feed being supplied by the grinding mill. A swingable horizonal conveyor mounted at the upper end of the second upright screw conveyor permits the mixed material discharging therefrom to be selectively conveyed either to the tank or to an external discharge station.

---

This invention relates to improvements in mobile feed grinding and mixing and distributing apparatus. The principal objects of this invention are:

First, to provide feed grinding and mixing apparatus for agricultural use that may be towed by a tractor to a feeding station for animals and grind feed, mix feed supplements with the ground feed and discharge the feed mixture, using power from a tractor for both movement of the apparatus and operation of the apparatus.

Second, to provide a feed grinding and mixing mill that will thoroughly mix ground feed materials with prepared feed supplements prior to discharge of the mixture at a feeding station.

Third, to provide a grinding and mixing apparatus in which the material being mixed can be quickly and uniformly mixed, and in which a section of the mixing apparatus is adjustable to constitute a delivery or discharge conduit and spout for the mixed feed.

Fourth, to provide a grinding and mixing apparatus for animal feed that will rapidly and easily receive locally produced or available natural feed such as corn, hay, grains etc. and deliver them to a mill for grinding and subsequent mixing with prepared feed supplements.

Fifth, to provide a grinding and mixing apparatus of the type described in which fine particles or dust of the feed material created in the grinding operation are not lost during the grinding and mixing operation.

Sixth, to provide a novel drive arrangement for a grinding, mixing and dispensing apparatus in which a power take-off connection to a tractor is permanently connected to mixing and dispensing apparatus including conveyors for receiving and forwarding feed from a grinding mill and a feed supplement hopper, and in which the same power take-off connection is selectively and releasably connected to the grinding mill and bulk feed conveyors for conveniently delivering unground feed to the mill.

Other objects and advantages of the invention will be apparent from a consideration of the following description and claims. The drawings, of which there are four sheets, illustrate a highly practical and preferred embodiment of the invention.

FIG. 1 is a perspective view, from the front right quarter angle, of the mixing and grinding apparatus with a portion of the mixing apparatus adjusted into position to act as a feed dispenser and distributor.

FIG. 2 is a fragmentary top plan view of the apparatus, with the adjustable portion of the mixing apparatus adjusted to feed mixing position.

FIG. 3 is an elevational view from the left side of the apparatus as shown in FIG. 2 with a portion of the mixing tank broken away to show internal mixing elements.

FIG. 4 is a fragmentary vertical cross sectional view taken along the plane of the broken line 4—4 in FIG. 2 and illustrating the relation of the conveyors from and to the mixing tank and from the mill and supplement supply hopper.

FIG. 5 is an enlarged fragmentary elevational view, partially broken away in section, of the adjustable portion of the mixing apparatus.

FIG. 6 is a fragmentary transverse cross sectional view taken along the plane of the line 6—6 in FIGS. 2 and 8.

FIG. 7 is a fragmentary rear elevational and partial cross sectional view taken along the plane of the line 7—7 in FIG. 8.

FIG. 8 is an enlarged fragmentary plan view of the front part of the apparatus with parts broken away to show subadjacent mechanism.

In the feeding of live stock it is common to grind locally grown natural feeds such as shell corn, unshelled corn, grains, hay etc, and mix this ground natural feed with manufactured feed supplements that are concentrated in selected nutritional elements. This feeding is commonly accomplished at feeding stations or locations that may be separated by considerable distances on a farm or extended along a fence or enclosure for the livestock.

The apparatus of the invention which performs this grinding, mixing and distributing function consists generally of a towable trailer having a chassis frame 10, wheels 12 and a towing hitch 14 by means of which the trailer may be connected to a farm tractor having a power take-off shaft (not illustrated) as is common. A mixing tank indicated generally at 16 is mounted on the rear of the chassis between the wheels. Forwardly of the tank is a natural feed supply conveyor indicated generally at 18 and located on the left side of the chassis. The conveyor 18 delivers natural feed into a receiving box 20 having a hood 22 thereover. A screw conveyor 24 located in the bottom of the box (see FIGS. 6 and 8) delivers the natural feed to a grinding mill 26 located near the front of the chassis. The mill is of the type illustrated in Patent No. 2,617,600 to Cole and so is not shown or described in great detail. The ground feed is carried out of the mill, rearwardly by a screw conveyor 28 (see FIGS. 6 and 8) through the bottom of a food supplement supply hopper 30 where supplemental food concentrates are introduced into the stream of the feed, to the bottom of an upright screw conveyor indicated generally at 32. At the top of the upright conveyor 32 is a swingably mounted transfer conveyor 34 that can be swung selectively over the tank 16 as in FIG. 2 or to a laterally extending discharge or distributing position as shown in FIG. 1 and by the dotted lines 34A in FIG. 2. The swingable end of the transfer conveyor 34 has a rotatably adjustable section 36 on which a discharge spout 38 is mounted at an angle to the axis of the transfer conveyor.

By rotating the adjustable section 36, the shorter end 40 of the spout 38 may be directed downwardly and forwardly to discharge into an inlet opening 42 in the top of the mixing tank; or the long end 44 of the spout may be directed downwardly and outwardly as a feed delivery or distributor spout.

Feed introduced into the tank 16 through the opening 42, or an auxiliary inlet opening 46 having a cover 48, falls into the path of the arms or blades of a mixing and distributing impellor 50 mounted on a shaft 52 extending vertically near the center of the mixing tank. The lower portion of the tank has downwardly converging walls 54 (see FIG. 4) that merge into a bottom wall 56 defining an outlet opening 58 to a discharge conveyor indicated generally at 60. A downwardly diverging conical deflector 62 on the shaft 52 causes material in the middle of the tank to be diverted and mixed with material located along the sides of the tank in passing to the conveyor 60. A sweeper arm 63 is rotated over the bottom of the tank by the shaft 52.

The conveyor 60 delivers to the bottom of the same upright conveyor 32 as the conveyor 28 and so long as new ground feed from the mill or supplement from the hoppers 30 and partially mixed feed from the mixing tank are being simultaneously introduced at the bottom of the upright conveyor, further mixing takes place at that point. In fact the screw auger 64 of conveyor 60 is driven through a universal joint 66 from the screw auger 68 of conveyor 28 and the action of the end of auger 68 opposed to that of auger 64 causes further mixing as material is fed to and carried up by the screw auger 70 in upright conveyor 32.

The several conveyors and the grinding mill are connected to be driven by a power take-off shaft indicated generally at 701 and connectable by a universal joint 72 to the power take-off shaft of a tractor. The shaft 701 is connected by another universal joint 74 to a first drive shaft or counter shaft 76 mounted in suitable bearings 78 mounted on frame elements 80 attached to the chassis frame 1 (see FIG. 8). A sprocket 82 on the front end of the shaft continually drives a chain 84 that extends down and cross to a sprocket on a shaft 86 extending forwardly from a gear box 88 mounted on the lower portion of the mill 26. The shaft extends into the mill and drives the screw auger 68 of the conveyor 28 to remove ground feed from the mill as previously described. A downwardly extending shaft 92 driven by suitable bevel gears in the gear box drives a sprocket 94 and chain 96 that extends rearwardly below the chassis frame to a sprocket 98 on the lower end of shaft 100. Shaft 100 drives the screw auger 70 in the upright conveyor.

Rearwardly of the sprocket 82, shaft 76 carries two freely rotatable sprockets 104 that carry chains 106 extending to coacting sprockets 108 on the shafts 110 of the mill. Sprockets 104 are selectively connectable to shaft 76 by means of a clutch collar or flange 112 driven by the shaft and a clutch pin 114 manually engageable between the collar and the sprockets. The mill can thus be disengaged while the mixing and discharging functions of the apparatus are functioning.

The rear end of shaft 76 carries a pulley 116 which is desirably of a well known spring pressed variable diameter type. A belt 118 extends from the variable pulley to a pulley 120 on the countershaft 122 that is carried by the framework of the conveyor 18. As appears more clearly in FIG. 6, an angled lever 124 is secured to the frame element 80 by a friction holding disc 126 and carries an idler pulley 128. The lever 124 and pulley may be used as a clutch and speed change mechanisms to selectively control the rotation of countershaft 122 from shaft 76. At the rear side of conveyor 18 the shaft 122 carries a pulley 130 and two different sized sprockets 132 and 134. A belt 136 extends from the pulley to a pulley 138 on the shaft 140 driving the screw auger 142 of conveyor 24 that delivers to the mill as previously described. A chain 144 selectively engageable with one or the other of sprockets 132 or 134 is trained around a sprocket 146 on the lower shaft 148 of the conveyor 18.

A tightener shoe or block 150 carried by the lever 152 (see FIG. 7) is biased by spring 154 to keep the chain 144 tight. An idler pulley 156 carried by the lever 158 and spring biased by the spring 160 keeps the belt 136 tight.

The conveyor 18 consists of a suitable conveyor way or plate 162 over which flight bars 164 are advanced upwardly by side chains 166. The chain passes over sprockets 168 on an idler shaft 170 at the top of the conveyor. Suitable side frame members 172 support the way and shafts of the conveyor and constitute side walls for the conveyor way. A widened hopper 174 at the lower end of the conveyor facilitates loading natural feeds into the conveyor.

The feed supplement hopper 30 is provided with a cover 176 and has a laterally inclined inner wall 178 that terminates at the lower open end of the hopper in an opening into the tube 180 of the conveyor 28. Since the mill 26 has fan elements (not shown) that create air pressure in the mill housing, fine particles and dust are blown into the conveyor 28. This dust and the air carrying it along are prevented from escaping from the hopper by the cover 176 and are vented through an upright dust tube 280 opening through the wall 176. Tube 280 extends upwardly to a laterally extending portion 182 that opens tangentially into a conical dust separator 184 mounted on top of the mixing tank 16. Dust which contains substantial food value is thus collected and permitted to fall into the mixing tank. In order to prevent pressure created in the mill from blowing back through the inlet 186 to the mill (see FIG. 6), baffle plate 188 is pivotally mounted at 190 on the hood 22 to hang in the opening over the conveyor way 162. The hood is tiltable about a pivot 192 as indicated at 22A to permit access to the receiving box 20 and conveyor 24.

The mechanism for adjusting the transfer conveyor 34 is best shown in FIG. 5. The tubular wall 194 of upright conveyor 32 has a plate 196 secured thereto on which rests the flange 198 of a corner box 200. A retaining lug 202 loosely held by bolt 204 holds one side of the flange to the plate while an adjustable lug 206 actuated by the hand wheel 208 on bolt 210 releasably clamps the box in its rotatably adjusted position. The shaft 100 of the screw auger 70 runs through suitable bearings 212 and 214 to an upper sprocket 216 that drives chain 218. The chain drives a sprocket 220 on the upper end of the mixer shaft 52. The shaft 222 of the screw auger 224 in the transfer conveyor 34 extends through a bearing 226 in the wall 228 and has a bevel gear 230 meshing with gear 232 on shaft 100 to be driven thereby.

The outer end of the tube 234 of transfer conveyor 34 and the adjacent end of the adjustable portion 36 of the conveyor have opposed flanges 236 that are releasably held in rotatably adjustable positions by clamps 238. The outer end of shaft 222 is supported in a suitable bearing bracket 240 on the outer side of the adjustable spout 38.

In operation of the apparatus, the power take-off shaft is connected to a tractor and clutch pin 114 is engaged. A supply of food supplement is placed in hopper 30 and cover 176 is put on the hopper. The vent door 242 in the top of dust separator 184 is closed by letting lever 244 move up with the operating cord 246. A supply of natural feed is placed in the hopper 174 of conveyor 18. The tractor engine and take-off shaft are started and lever 124 is moved to tighten belt 118 and start the countershaft 122, conveyor 18 and 24. With the transfer conveyor 34 and spout 44 adjusted as shown in FIGS. 2 and 3, natural feed is delivered to the mill and ground. The ground feed mixed with supplement from hopper 30 is delivered through conveyors 28, 32, 34 and spout 44 to the mixing tank. It will be understood that natural feed is continued to be added to conveyor 18 until the amount of feed in the tank 16 as determined by observing the level of feed through the viewing windows 248 reaches the desired amount. During this time the feed previously ground is being recirculated from the bottom of the tank through conveyor 60 to be mixed with incoming natural feed from conveyor 28 and the mill. After the desired amount of feed is in the tank, the mill may be stopped by disengaging clutch pin 114 and conveyors 18 and 24 may be stopped by operating lever 124 to loosen belt 118. Conveyors 28, 32, 34 and 60 may be operated longer to assure even mixture of the last ground natural food with the feed supplement and the previously ground feed.

The tractor drive may be stopped while the transfer conveyor 34 and spout 44 are adjusted to the positions shown in FIG. 1. Restarting the tractor drive then causes the circulating conveyors of the mixer to deliver the ground and mixed feed to a feeding station at the side of the machine. Being in an elevated position, the spout 44 may discharge over a fence or enclosure for the stock being fed.

We claim:

1. Feed mixing apparatus comprising:
a mill adapted to grind natural feed,
a first screw conveyor connected to deliver ground feed from said mill,
a supplement feed hopper opening to said first screw conveyor,
conveyor means arranged to deliver natural feed to said mill,
a mixing tank having an upright shaft with a mixing impellor thereon and rotatably mounted in said tank,
a second screw conveyor positioned to receive material from said tank and extending into opposed intersecting relation to the end of said first screw conveyor,
said second conveyor being driven from said first conveyor at the intersection of the conveyors,
an upright screw conveyor extending from the intersection of said first and second screw conveyors to receive material therefrom,
a horizontally swingable conveyor mounted on top of said upright conveyor and swingable between a laterally extended position and a position projecting over said tank,
said horizontally swingable conveyor having a screw auger therein connected to be driven from said upright screw conveyor,
a rotatably adjustable coaxial portion on the end of said swingable conveyor and having a discharge spout connected thereto at an acute angle to the axis of the horizontally swingable conveyor,
and drive means releasably drivingly engageable with said mill and said conveyor means and separately drivingly connected to said screw conveyors and said upright shaft.

2. Feed mixing apparatus comprising:
a mill adapted to grind natural feed,
a first screw conveyor connected to deliver ground feed from said mill,
a supplement feed hopper opening to said screw conveyor,
conveyor means arranged to deliver natural feed to said mill,
a mixing tank having an upright shaft with a mixing impellor thereon and rotatably mounted in said tank,
a second screw conveyor positioned to receive material from said tank and extending into opposed intersecting relation to the end of said first screw conveyor,
an upright screw conveyor extending from the intersection of said first and second screw conveyors to receive material therefrom,
a horizontally swingable conveyor mounted on top of said upright conveyor and swingable between a laterally extended position and a position projecting over said tank,
said horizontally swingable conveyor having a screw auger therein connected to be driven from said upright screw conveyor,
and drive means releasably drivingly engageable with said mill and said conveyor means and separately drivingly connected to said screw conveyors and said upright shaft.

3. Feed mixing apparatus comprising:
a mill adapted to grind natural feed,
a first screw conveyor connected to deliver ground feed from said mill,
a supplement feed hopper opening to said first screw conveyor,
conveyor means arranged to deliver natural feed to said mill,
a mixing tank having an upright shaft rotatably mounted therein, said shaft having an impeller thereon,
a second screw conveyor positioned to receive material from said tank,
an upright screw conveyor adapted to receive material from said first and second screw conveyors, and
a horizontally swingable conveyor mounted on top of said upright conveyor and swingable between a laterally extended position and a position projected over said tank.

4. A feed mixing apparatus according to claim 3, wherein said horizontally swingable conveyor has a screw member mounted therein and means connecting the screw member to said upright screw conveyor for drivingly interconnecting same.

5. A feed mixing apparatus according to claim 3, further including drive means releasably drivingly engageable with said mill and said conveyor means and separately drivingly connected to said screw conveyors and said upright shaft.

6. A mobile feed grinding, mixing and dispensing apparatus comprising:
a frame,
wheel means rotatably mounted on the frame and adapted to rollingly engage the ground,
a mill mounted on said frame and adapted to grind natural feed,
first conveyor means adapted to transport natural feed from said mill,
second conveyor means adapted to deliver natural feed to said mill,
a mixing tank mounted on said frame and having an upright shaft rotatably mounted therein, said shaft having a mixing impeller mounted thereon,
an upright screw conveyor adapted to receive material from said first conveyor means,
a supplement feed hopper mounted on said frame,
third conveyor means for transporting supplement from said hopper to said upright screw conveyor,
fourth conveyor means for transferring material from said tank to said upright screw conveyor,
means mounted adjacent the upper end of said upright screw conveyor member for discharging material therefrom either to said tank or to an external discharge station, said means including a swingable conveyor mounted for swingable movement in a substantially horizontal direction and adapted to receive material from said upright screw conveyor for discharging same to said external discharge station, and
driveable means for rotatably driving said conveyor means.

7. An apparatus according to claim 6, wherein said third conveyor means for transporting supplement to the upright screw includes a first screw conveyor and wherein said fourth conveyor means for transporting material from the tank to the upright screw conveyor includes a second screw conveyor.

References Cited

UNITED STATES PATENTS

| | | | |
|---|---|---|---|
| 2,815,941 | 12/1957 | Schmale | 241—63 |
| 2,953,360 | 9/1960 | Kline | 259—9 |
| 3,150,863 | 9/1964 | Ronk et al. | 259—9 |

GERALD A. DOST, *Primary Examiner.*